US009411432B2

(12) United States Patent
Tang et al.

(10) Patent No.: US 9,411,432 B2
(45) Date of Patent: Aug. 9, 2016

(54) SYSTEMS AND METHODS FOR ENABLING GESTURE CONTROL BASED ON DETECTION OF OCCLUSION PATTERNS

(71) Applicant: FUJI XEROX CO., LTD., Tokyo (JP)

(72) Inventors: Hao Tang, Sunnyvale, CA (US); Patrick Chiu, Mountain View, CA (US); Qiong Liu, Cupertino, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 42 days.

(21) Appl. No.: 14/218,891

(22) Filed: Mar. 18, 2014

(65) Prior Publication Data
US 2014/0313122 A1 Oct. 23, 2014

Related U.S. Application Data

(63) Continuation-in-part of application No. 13/865,990, filed on Apr. 18, 2013.

(51) Int. Cl.
*G06F 3/03* (2006.01)
*G06F 3/01* (2006.01)
*G06F 3/00* (2006.01)
*G06F 3/042* (2006.01)

(52) U.S. Cl.
CPC ............. *G06F 3/0317* (2013.01); *G06F 3/005* (2013.01); *G06F 3/017* (2013.01); *G06F 3/0425* (2013.01)

(58) Field of Classification Search
None
See application file for complete search history.

(56) References Cited

U.S. PATENT DOCUMENTS

| | | | |
|---|---|---|---|
| 2006/0004280 A1* | 1/2006 | Kotake et al. | 600/414 |
| 2009/0116742 A1* | 5/2009 | Nishihara | 382/173 |
| 2011/0246785 A1* | 10/2011 | Linsley et al. | 713/189 |
| 2012/0192117 A1* | 7/2012 | Migos et al. | 715/863 |
| 2012/0320092 A1* | 12/2012 | Shin | G06F 3/0425 345/633 |
| 2013/0113920 A1* | 5/2013 | Blanton et al. | 348/135 |
| 2015/0160741 A1* | 6/2015 | Jesme et al. | 345/156 |

OTHER PUBLICATIONS

Chan, Li-Wei, et al. "Enabling beyond-surface interactions for interactive surface with an invisible projection." Proceedings of the 23nd annual ACM symposium on User interface software and technology. ACM, 2010.*

(Continued)

*Primary Examiner* — Chan Park
*Assistant Examiner* — Geoffrey E Summers
(74) *Attorney, Agent, or Firm* — TransPacific Law Group; Pavel I. Pogodin, Esq.

(57) ABSTRACT

Described is an approach to enabling gesture interactions for the viewport widget in a graphical user interface (GUI) library. The gesture interactions may include continuous operations such as panning, zooming and rotating of the viewport's content with fingers (or styluses). The approach is based on using a camera to detect occlusion patterns in a sensor grid rendered over the viewport. The sensor grid consists of sensor blobs, which are small blobs of pixels with a distinct color. A sensor blob is aware of its location in both the viewport's coordinate system and the camera's coordinate system, and triggers an occlusion event at the location when it is occluded by a finger (or stylus). Robust techniques are devised to eliminate unintentional gestures, provide visual guidance and feedback for interactions, and minimize the visual interference of the sensor grid with the viewport's content.

23 Claims, 12 Drawing Sheets

(56) References Cited

OTHER PUBLICATIONS

Dedual, Nicolas J., Ohan Oda, and Steven K. Feiner. "Creating hybrid user interfaces with a 2D multi-touch tabletop and a 3D see-through head-worn display." Mixed and Augmented Reality (ISMAR), 2011 10th IEEE International Symposium on. IEEE, 2011.*

Hu Jun, et al. "Bare-fingers touch detection by the button's distortion in a projector-camera system." Circuits and Systems for Video Technology, IEEE Transactions on 24.4 (2014): 566-575.*

Lee, Gun A., Mark Billinghurst, and Gerard Jounghyun Kim. "Occlusion based interaction methods for tangible augmented reality environments." Proceedings of the 2004 ACM SIGGRAPH international conference on Virtual Reality continuum and its applications in industry. ACM, 2004.*

Mynatt, Elizabeth D., et al. "Flatland: new dimensions in office whiteboards." Proceedings of the SIGCHI conference on Human Factors in Computing Systems. ACM, 1999.*

Ulusoy, Ali Osman, Fatih Calakli, and Gabriel Taubin. "One-shot scanning using de bruijn spaced grids." Computer Vision Workshops (ICCV Workshops), 2009 IEEE 12th International Conference on. IEEE, 2009.*

H. Uchiyama and H. Saito, "Random dot markers," Virtual Reality Conference (VR), 2011 IEEE, Singapore, 2011, pp. 35-38.*

Aviv, A., Gibson, K., Mossop, E., Blaze, M., Smith, J. Smudge attacks on smartphone touch screens. Proc. of 4th USENIX Workshop on Offensive Technologies (WOOT '10).

Celluon Magic Cube projection keyboard. http://celluon.com/products.php visited on Mar. 18, 2014.

Harrison, C., Benko, H., Wilson, A. OmniTouch: wearable multitouch interaction everywhere. Proc. UIST '11, pp. 441-450, Santa Barbara, CA, USA.

Kane, S.K. et al. Bonfire: a nomadic system for hybrid laptop-tabletop interaction. Proc. of UIST '09, pp. 129-138, Oct. 4-7, 2009, Victoria, British Columbia, Canada.

Liao, C. et al. Fine-grained cross-media interaction with documents via a portable hybrid paper-laptop interface. Proc. of ACM Multimedia 2010, pp. 361-370.

Liao, C. et al. MixPad: Augmenting interactive paper with mice & keyboards for fine-grained cross-media interaction with documents. UbiComp 2011 (demo), pp. 539-540.

Wachs, J. et al. A gesture-based tool for sterile browsing of radiology images. J. American Medical Informatics Assoc., 15 (3) 321-323 (2008).

Weiner, P. The DigitalDesk calculator: tangible manipulation on a desk top display. Proc. UIST '91, pp. 27-33.

Wilson, A.D. Using a depth camera as a touch sensor. Proc. ITS '10, pp. 69-72, Nov. 7-10, 2010, Saarbrücken, Germany.

* cited by examiner

SYSTEMS AND METHODS FOR ENABLING GESTURE CONTROL BASED ON DETECTION OF OCCLUSION PATTERNS

CROSS-REFERENCE TO RELATED PATENT APPLICATION

The present patent application relies upon, claims the benefit of priority from, and is a continuation-in-part of U.S. patent application Ser. No. 13/865,990 filed on Apr. 18, 2013, the entire disclosure of which is incorporated by reference herein.

BACKGROUND OF THE INVENTION

1. Technical Field

The disclosed embodiments relate in general to user interfaces of computing devices and, more specifically, to systems and methods for enabling gesture control based on detection of occlusion patterns.

2. Description of the Related Art

Gesture input is now a common way to interact with computer systems. Examples of devices that utilize gestures for user interaction include touchscreens on smartphones and tablets as well as in-the-air touchless gesture controllers for gaming systems. Exemplary systems for providing simple and low-cost gesture interaction capability for projected displays using a camera, are described, for example, in Kane, S. K., D. Avrahami, J. O. Wobbrock, B. Harrison, A. D. Rea, M. Philipose, and A. LaMarca, Bonfire: a nomadic system for hybrid laptop-tabletop interaction, Proc. of UIST '09, pp. 129-138 and Kjeldsen, R., C., Pingali, G., Hartman, J., Levas, T., Podlaseck, M, Interacting with steerable projected displays, Intl. Conf. on Automatic Face and Gesture Recognition (FGR '02), pp. 402-407.

From the user's point of view, touching a solid surface has clear advantages: it gives the user direct and physical feedback. Furthermore, the solid surface of the user interface device provides some support to the user's arm that reduces fatigue. In contrast, touchless gesturing near the surface has benefits in scenarios where the user's physical contact with the surface should be avoided for various reasons, such as in hospitals, factories, kitchens, or in other public places. Another situation in which touchless user interfaces are more desirable is when the security is an issue because touch residues are susceptible to "smudge attacks," as described, for example, in Aviv, A., Gibson, K., Mossop, E., Blaze, M., Smith, J. Smudge attacks on smartphone touch screens, Proc. of 4th USENIX Workshop on Offensive Technologies (WOOT '10).

U.S. patent application Ser. No. 13/865,990 describes an approach to enable touch and touchless interaction on a surface that uses the camera to monitor the graphical user interface widgets instead of tracking the fingers or hands. The widgets are designed with hotspots on them, and as the user makes a gesture over the widget, the system looks for patterns of occlusion over the hotspots (or more precisely, over several sensor pixels inside the hotspot). The hotspots are designed to be visually salient and provide feedback to the user. The advantages of the latter approach are that it has better perceived affordance than in-the-air gestures, it can be easily setup and calibrated, and is computationally more efficient than finger tracking. However, the system described in the aforesaid U.S. patent application Ser. No. 13/865,990 only supports user interaction widgets for generating discrete events (e.g. button clicks).

On the other hand, as would be appreciated by those of skill in the art, it would be advantageous to have a system that would support continuous user-interaction events, such as panning and zooming of an image. Some exemplary use scenarios for such a system would include viewing maps, photos, medical images, architectural drawings and the like. Thus, new and improved gesture based user interfaces with improved robustness of gesture detection are needed to handle these types of user applications.

SUMMARY OF THE INVENTION

The embodiments described herein are directed to methods and systems that substantially obviate one or more of the above and other problems associated with conventional methods for implementing user interfaces.

In accordance with one aspect of the inventive concepts described herein, there is provided a computer-implemented method for detecting a gesture performed by a user in connection with a user interface including a plurality of sensor blobs, the method being performed in a computerized system incorporating a central processing unit, a camera and a memory, the computer-implemented method involving: acquiring a plurality of images of the plurality of sensor blobs using the camera; using the central processing unit to identify occlusion of at least some of the plurality of sensor blobs by the user in the acquired plurality of images of the plurality of sensor blobs; and using the central processing unit to detect the gesture performed by the user based on the identified occlusion of at least some of the plurality of sensor blobs in the acquired plurality of images.

In one or more embodiments, the method further involves projecting the plurality of sensor blobs onto a display surface using a projector and projecting a content onto the display surface using the projector, wherein the projected plurality of sensor blobs overlay substantially the entire projected content.

In one or more embodiments, the method further involves displaying the plurality of sensor blobs using an electronic display device and displaying a content using the electronic display device, wherein the displayed plurality of sensor blobs overlay substantially the entire displayed content.

In one or more embodiments, the occlusion of at least some of the plurality of sensor blobs is identified based on color values at locations corresponding to the sensor blobs in the acquired plurality of images.

In one or more embodiments, the method further involves detecting a press event based on a condition that the identified occlusion of at least some of the plurality of sensor blobs matches a predetermined occlusion pattern and the identified occlusion persists for a predetermined time interval.

In one or more embodiments, the plurality of sensor blobs are displayed or projected onto a display surface and the detection of the gesture is performed in response to the detection of the press event.

In one or more embodiments, the method further involves, in response to the detection of the press event, displaying the plurality of sensor blobs or projecting the plurality of sensor blobs onto a display surface, wherein the plurality of sensor blobs are initially arranged around the location of the detected press event.

In one or more embodiments, the plurality of sensor blobs are arranged in a disk-shaped arrangement centered at a position of a last identified user-generated event.

In one or more embodiments, the method further involves detecting a release event based on a condition that the press event has been previously detected and: the identified occlusion of at least some of the plurality of sensor blobs does not occur for a second predetermined time interval; or the identified occlusion of at least some of the plurality of sensor blobs occurs at a location of the press event for a third predetermined time interval.

In one or more embodiments, the method further involves suspending the detection of the gesture in response to the detection of the release event.

In one or more embodiments, the method further involves, responsive to the detection of the gesture performed by the user, issuing a command associated with the gesture.

In one or more embodiments, the command associated with the gesture is selected from a group consisting of: an image panning command; an image zooming command and an image rotation command.

In one or more embodiments, the method further involves detecting a direction of the gesture performed by the user, wherein the issued command is based, at least in part, on the detected direction of the gesture.

In one or more embodiments, the method further involves detecting a speed of the gesture performed by the user, wherein the issued command is based, at least in part, on the detected speed of the gesture.

In one or more embodiments, the gesture is performed by the user without physical contact with the surface displaying the plurality of sensor blobs.

In one or more embodiments, the method further involves performing a calibration operation by identifying locations corresponding to each of the plurality of sensor blobs in the acquired plurality of images and storing information on the identified locations.

In one or more embodiments, the plurality of sensor blobs is arranged in a grid-like arrangement, wherein in c. detecting the gesture comprises detecting a user-generated event, the user-generated event being detected based on a condition that a first blob and at least one second blob adjacent to the first blob of the grid-like blob arrangement are occluded in accordance with a predetermined occlusion pattern and wherein the location of the user-generated event is the location of the first blob.

In one or more embodiments, the plurality of sensor blobs is arranged in a grid-like arrangement, wherein in c. detecting the gesture comprises detecting a user-generated event, the user-generated event being detected based on a condition that a first blob and at least one second blob adjacent to the first blob of the grid-like blob arrangement are occluded and at least one third blob of the grid-like blob arrangement is not occluded, the occlusion of the first and second blobs and non-occlusion of the third blob being in accordance with a predetermined occlusion pattern and wherein the location of the gesture is the location of the first blob.

In one or more embodiments, the gesture is detected based on two occlusions identified at two different times within a predetermined time interval.

In one or more embodiments, the two identified occlusions occur within a predetermined distance of one another.

In one or more embodiments, the detected gesture is a continuous gesture.

In one or more embodiments, the method further involves providing a gesture widget, wherein the plurality of sensor blobs are displayed or projected onto a display surface and the detection of the gesture is performed in response to the detection of an activation of the provided gesture widget by the user.

In accordance with another aspect of the inventive concepts described herein, there is provided a non-transitory computer-readable medium embodying a set of computer-executable instructions, which, when executed in a computerized system incorporating a central processing unit, a camera and a memory, cause the computerized system to perform a method for detecting a gesture performed by a user in connection with a plurality of sensor blobs, the method involving: acquiring a plurality of images of the plurality of sensor blobs using the camera; using the central processing unit to identify occlusion of at least some of the plurality of sensor blobs by the user in the acquired plurality of images of the plurality of sensor blobs; and using the central processing unit to detect the gesture performed by the user based on the identified occlusion of at least some of the plurality of sensor blobs in the acquired plurality of images.

In accordance with yet another aspect of the inventive concepts described herein, there is provided a computerized system incorporating: a user interface generation module for causing a user interface to be provided to a user, the user interface comprising a plurality of sensor blobs; a camera for acquiring a plurality of images of the user interface; an occlusion identification module for identifying occlusion of at least some of the plurality of sensor blobs by the user in the acquired plurality of images of the user interface; and a gesture detection module for detecting a gesture performed by the user based on the identified occlusion of at least some of the plurality of sensor blobs in the acquired plurality of images.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive concepts. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

To address the above and other problems associated with the conventional technology, one or more embodiments described herein implement an approach to enabling gesture interactions for the viewport widget in a graphical user interface (GUI) library. In one or more embodiments, the gesture interactions enabled by the described systems and methods may include continuous user-generated events, such as panning, zooming and rotating of the viewport's content with fingers (or styluses or other suitable objects). The term user-generated events used herein shall include both continuous user-generated events as well as other events such as simple presence of user's finger or other suitable object at a specific location. Thus, this term shall encompass any interaction of the user with the described interface. In one or more embodiments, the aforesaid gesture interactions are enabled using a camera to detect occlusion patterns in a sensor grid rendered over the viewport. The sensor grid consists of sensor blobs, which may be small blobs of pixels with a distinct color. A sensor blob is aware of its location in both the viewport's coordinate system and the camera's coordinate system, and triggers an occlusion event at the location when it is occluded by a finger (or stylus or other suitable object). In addition, in one or more embodiments, robust techniques are provided to eliminate unintentional gestures, provide visual guidance and feedback for interactions, and minimize the visual interference of the sensor grid with the viewport's content.

Figure 1:
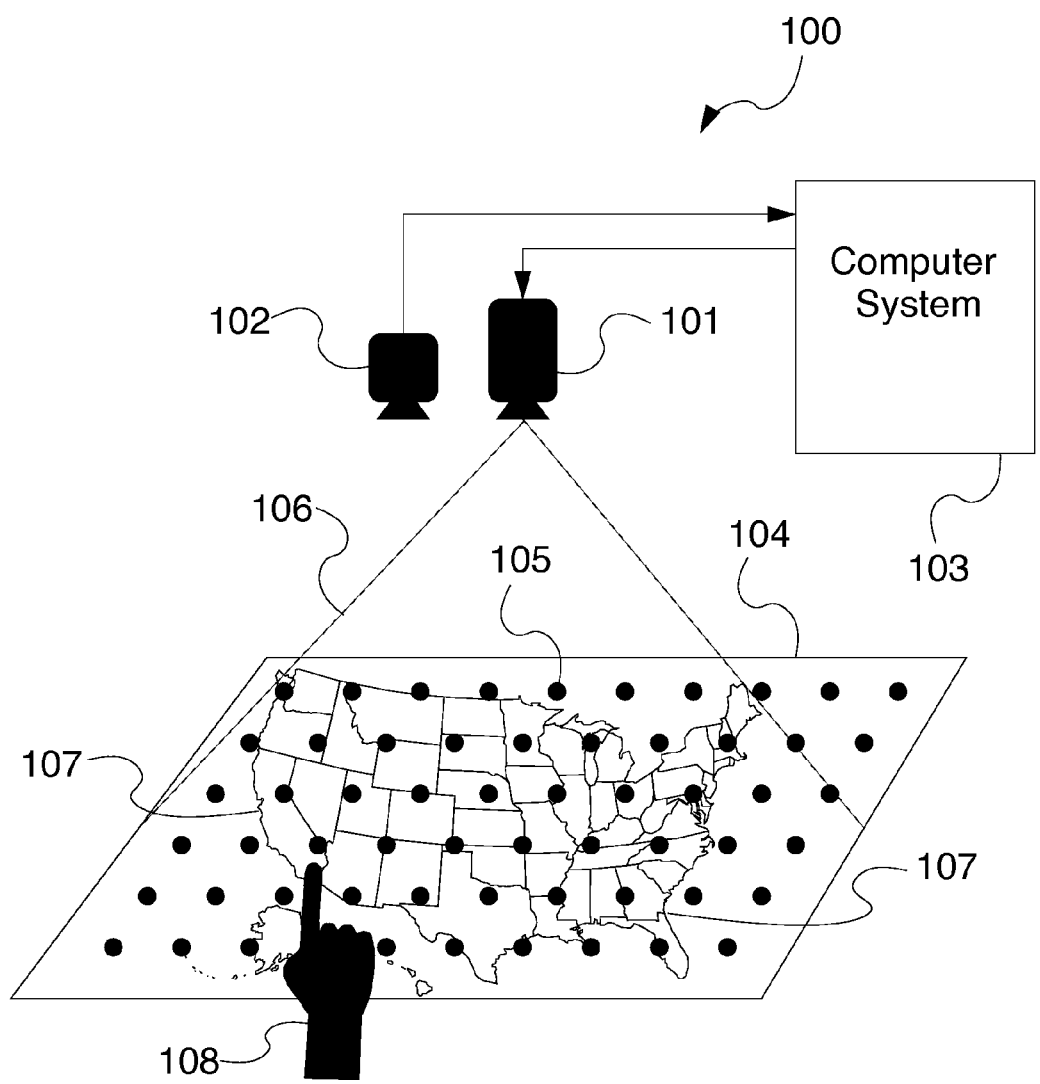
FIG. 1 illustrates an exemplary embodiment of a system for enabling gesture interactions for the viewport widget.

FIG. 1 illustrates an exemplary embodiment 100 of a system for enabling gesture interactions for the viewport widget. The illustrated embodiment 100 incorporates a projector 101 projecting a representation of a graphical user interface including content 107 and multiple sensor blobs 105 onto a display surface 104 positioned within illumination field 106 of the projector 101. As shown in FIG. 1, the sensor blobs 105 overlay the content 107 on the display surface 104. A camera 102 is positioned to have the display surface 104 within its field of view to acquire the video of the graphical user interface projected on the display surface 104 and to detect the gestures performed by a hand of the user 108 in connection with the displayed sensor blobs 105. In one or more embodiments, the camera 102 may be positioned adjacent to or in the proximity of the projector 101. In one or more embodiments, the projector 101 and the camera 102 are conventional off-the-shelf components widely available on the market.

As stated above, the graphical user interface projected by the projector 101 on the display surface 104 may include one or more sensor blobs 105 described in detail below. In one embodiment, the display surface 104 may be a horizontal surface, such as a top surface of a desk or a table. In this configuration, the projector 101 and the camera 102 are mounted above the display surface 104. In another embodiment, the display surface 104 may be oriented vertically. The video acquired by the camera 102 is transmitted to a computer system 103, where it is processed by a video processing module 1118 described in detail bellow in connection with FIG. 11 to detect user's gestures based on occlusion patterns of the sensor blobs 105 displayed on the display surface 104 by user's hand 108 or any other object, such as stylus. In one embodiment, the user may use his or her finger or fingers as well as any other suitable objects to perform the gestures usable in connection with the exemplary embodiment 100 of FIG. 1. In one or more embodiments, the computer system 103 may be further configured to control the projector 101, as shown in FIG. 1. On the user's gesture is detected, the computer system 103 may be configured to perform the corresponding operation. In one or more embodiments, the sensor blobs 105 are projected onto the display surface 104 using light not visible to the user, such as light in the infrared portion of the spectrum. In this configuration, an infrared sensitive camera 102 may be employed in order to detect the occlusion of these sensor blobs.

Figure 2:
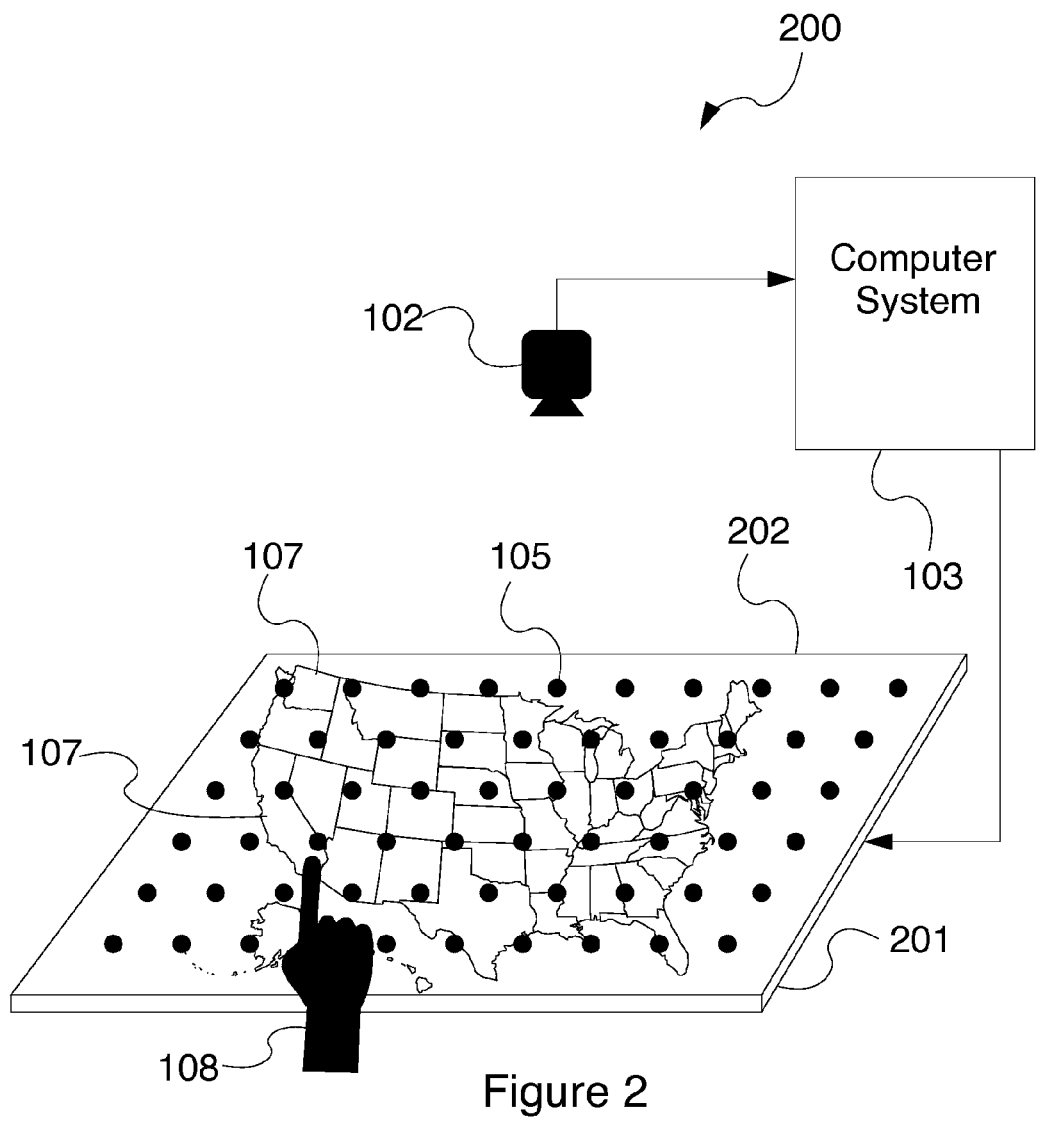
FIG. 2 illustrates another exemplary embodiment of a system for employing user interface sensor blobs for user gesture detection.

FIG. 2 illustrates another exemplary embodiment 200 of a system for employing user interface sensor blobs for user gesture detection. In the embodiment 200, the projector 101 and the display surface 104 of FIG. 1 are replaced with an electronic display panel 201, which displays the graphical user interface on its surface 202. In one or more embodiments, the electronic display panel 201 may be an LCD panel, a plasma display panel or any other type of electronic information display device well known to persons of ordinary skill in the art. As in the embodiment 100, the camera 102 is positioned to have the display surface 202 of the electronic display panel 201 within its field of view to acquire the video of the graphical user interface displayed by the display panel 201 as well as the gestures performed by the user's hand 108 or another object.

Figure 3:
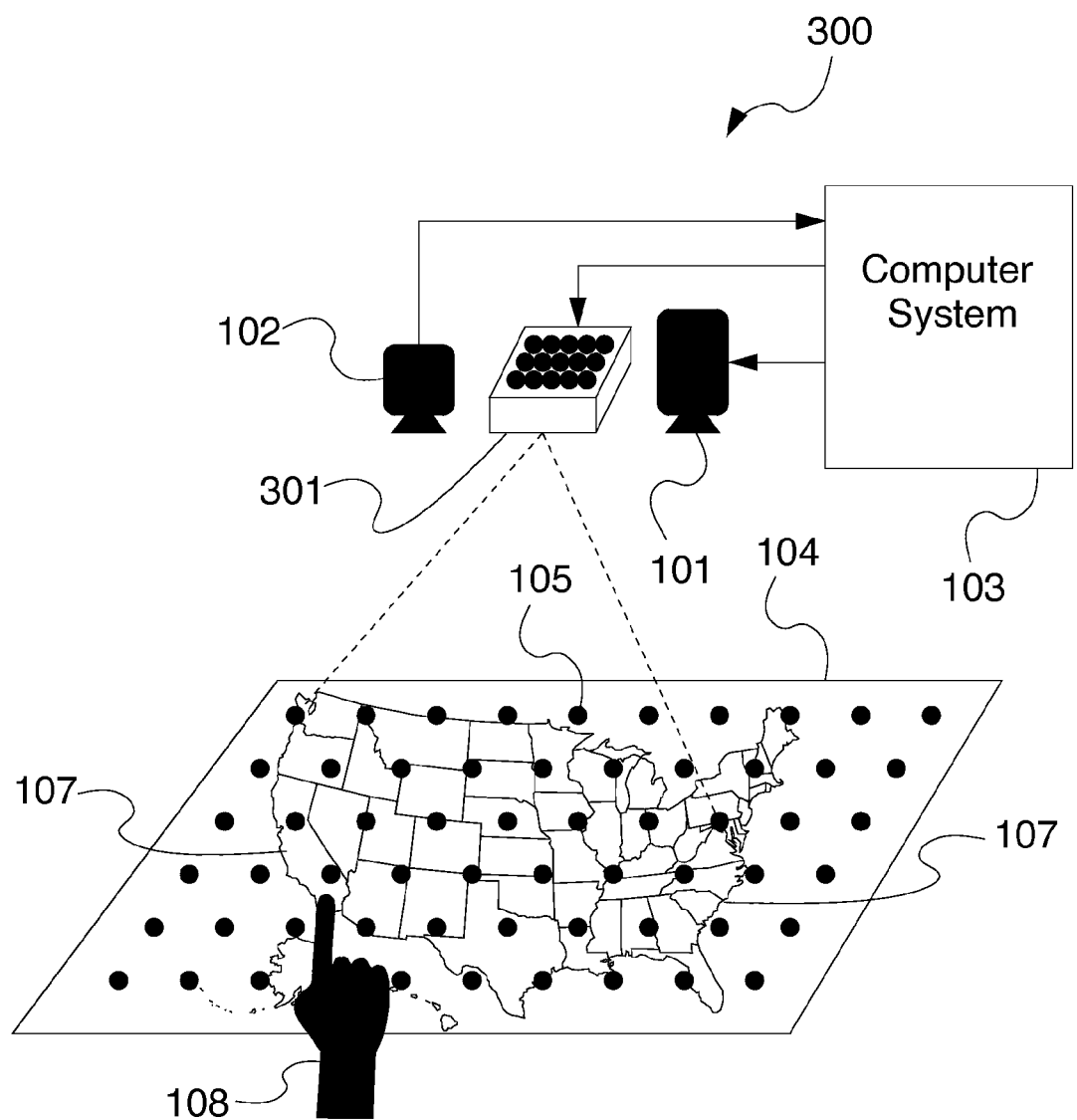
FIG. 3 illustrates yet another exemplary embodiment of a system for employing user interface sensor blobs for user gesture detection.

FIG. 3 illustrates yet another exemplary embodiment 300 of a system for employing user interface sensor blobs for user gesture detection. The embodiment 300 shown in FIG. 3 additionally includes a light-emitting array 301 configured to project multiple sensor blobs 105 onto the display surface 104. The light-emitting array 301 is positioned and oriented such that the sensor blobs 105 projected by the light-emitting array 301 overlay the content 107 projected onto the display surface 104 by the projector 101. As in the embodiment 100, the camera 102 is positioned to have the content 107 and the sensor blobs 105 within its field of view. In one or more embodiments, the light-emitting array 301 is a semiconductor laser array or an array of light-emitting diodes. In one or more embodiments, the light-emitting array 301 may incorporate suitable optics to ensure proper focusing of the projected sensor blobs 105. In one or more embodiments, the sensor blobs 105 are projected by the light-emitting array 301 onto the display surface 104 using light not visible to the user, such as light in the infrared portion of the spectrum.

In yet alternative embodiment, the sensor blobs 105 may be permanently printed on a flat surface, such as on a piece of paper or any other object or medium. In this embodiment, the camera 102 will be positioned to have the paper with the printed sensor blobs within its field of view to acquire the video of the sensor blobs as well as the gestures performed by the user in connection with the printed sensor blobs. It should be noted that the inventive concepts described herein are not limited by any specific medium displaying or embodying the sensor blobs usable in connection with detection of user gestures. Any system that would provide information on dynamic occlusion of the projected, displayed or printed sensor blobs by user's body parts or other objects could be usable for implementing the described gesture detection functionality.

In one or more embodiments, a sensor blob 105 is a small blob of pixels with a distinct color rendered over the content 107. In various embodiments, the multiple sensor blobs 105 have the same or different colors. Different colors may also be used within the same sensor blob. The computer system 103 stores the location coordinates of each sensor blob 105 in both viewport and camera coordinate systems. These location coordinates of the sensor blobs 105 may be obtained using the calibration procedure described in details below. Using the camera 102, the computer system 103 detects the change of color that occurs over the location of the sensor blob and, based on the detected color change, triggers an occlusion event at the corresponding location. The size of the sensor blob affects how robust the system is to small displacements of the hardware setup and how much of the visual content 107 is occluded by the visible presence of the sensor blob. In one or more embodiments, the size of the sensor blobs 105 is empirically set to balance the above factors, but its optimal value may be determined by a simple calibration procedure.

In one or more embodiments, a sensor grid is an M×N grid of evenly spaced sensor blobs 105 that cover the content 107. In one or more embodiments, each sensor blob 105 in the sensor grid functions independently, and all the location-bearing occlusion events are aggregated within the computer system 103. The size of the sensor grid affects the spatial resolution of the sensing capability of the system and the degree of visual interference of the sensor blobs 105 with the displayed visual content 107. The width of human fingers is an important measurement for determining the spacing distance between adjacent sensor blobs 105 in the sensor grid. Although often empirically set, all the aforesaid parameters regarding the sensor grid may be automatically computed via a simple calibration procedure. In addition, the aforesaid calibration procedure may involve performing image analysis on the still images and/or video frames acquired using the camera 102 in order to determine the exact locations of the sensor blobs 105 within the viewport.

Figure 4:
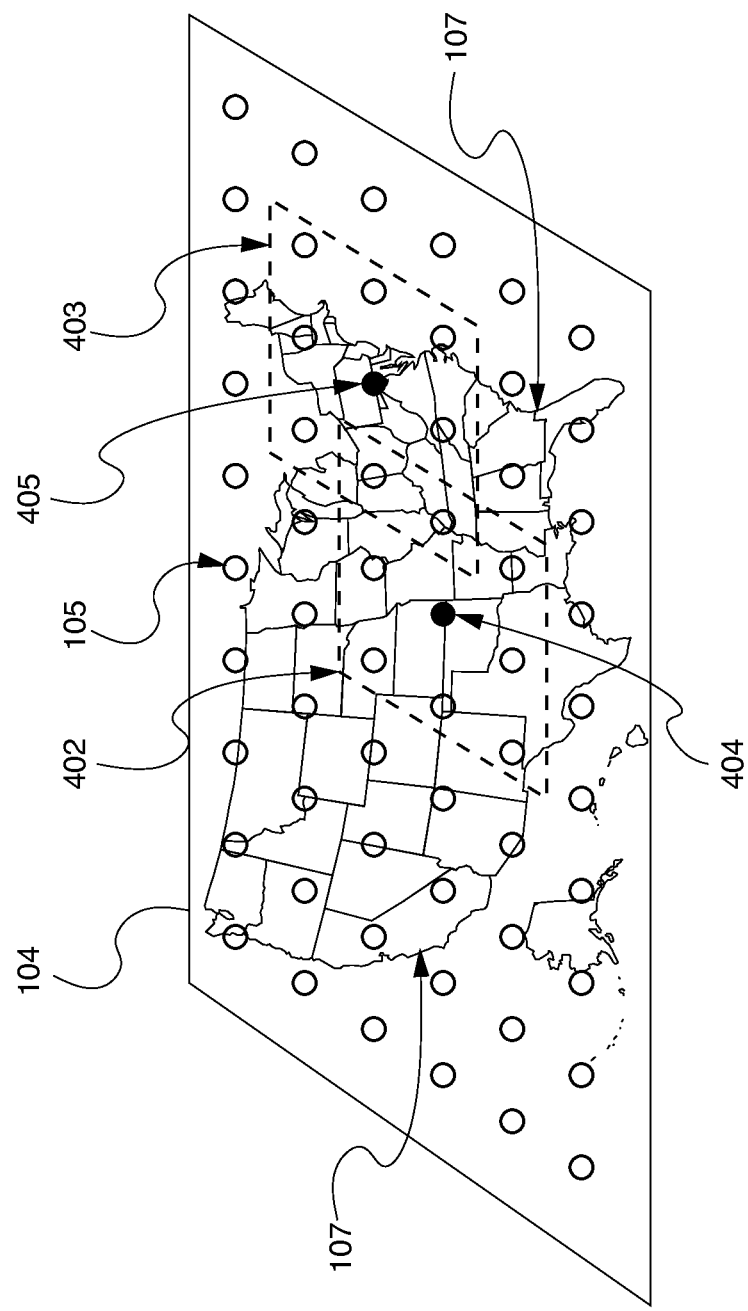
FIG. 4 illustrates an exemplary close-up view of a sensor grid of sensor blobs overlaying the content in an image acquired by the camera.

FIG. 4 illustrates an exemplary close-up view of a sensor grid of sensor blobs 105 overlaying the content 107 in an image acquired by the camera 102. In the shown view, the sensor blobs 404 and 405 are occluded. In one or more embodiments, after the detection of the occluded sensor blobs 404 or 405, the computer system 103 is configured to check for occlusions of the neighboring blobs within neighborhoods 402 and 403, respectively, to detect predetermined sensor blob occlusion patterns described in detail below.

In one or more embodiments, the occlusion patterns (OPs) are specifically designed patterns of sensor blob locations in the sensor grid where occlusion events occur. Once detected, an occlusion pattern represents the presence of a finger (or stylus or any other suitable object) at the center location of the occlusion pattern. In one embodiment, an occlusion pattern is defined as a 3×3 block of sensor blobs where the center sensor blob has triggered an occlusion event and at the same time at most a predetermined number (for example, two) of the other sensor blobs also have triggered occlusion events, and these sensor blobs must be connected (adjacent to one another). Thus, in general terms, the occlusion pattern may be detected based on a minimum number of the occluded sensor blobs in the sensor blob block, the maximum number of the occluded sensor blobs as well as an additional constraint, such as the requirement that the occluded sensor blobs be connected (adjacent to each other). In one or more embodiments, the occlusion pattern may require that sensor blobs should be continuously occluded from the center blob to one or more edge blobs of the sensor blob block. In general terms, the occlusion pattern may be consistent with occlusion of the sensor blobs in the sensor blob block with an object (e.g. finger). It should be noted that the invention is not limited to the described exemplary 3×3 block of sensor blobs used for the occlusion pattern detection and any other blocks of sensor blobs may be used. Also, a wide variety of occlusion patterns may be used to detect user gestures.

Figure 5:
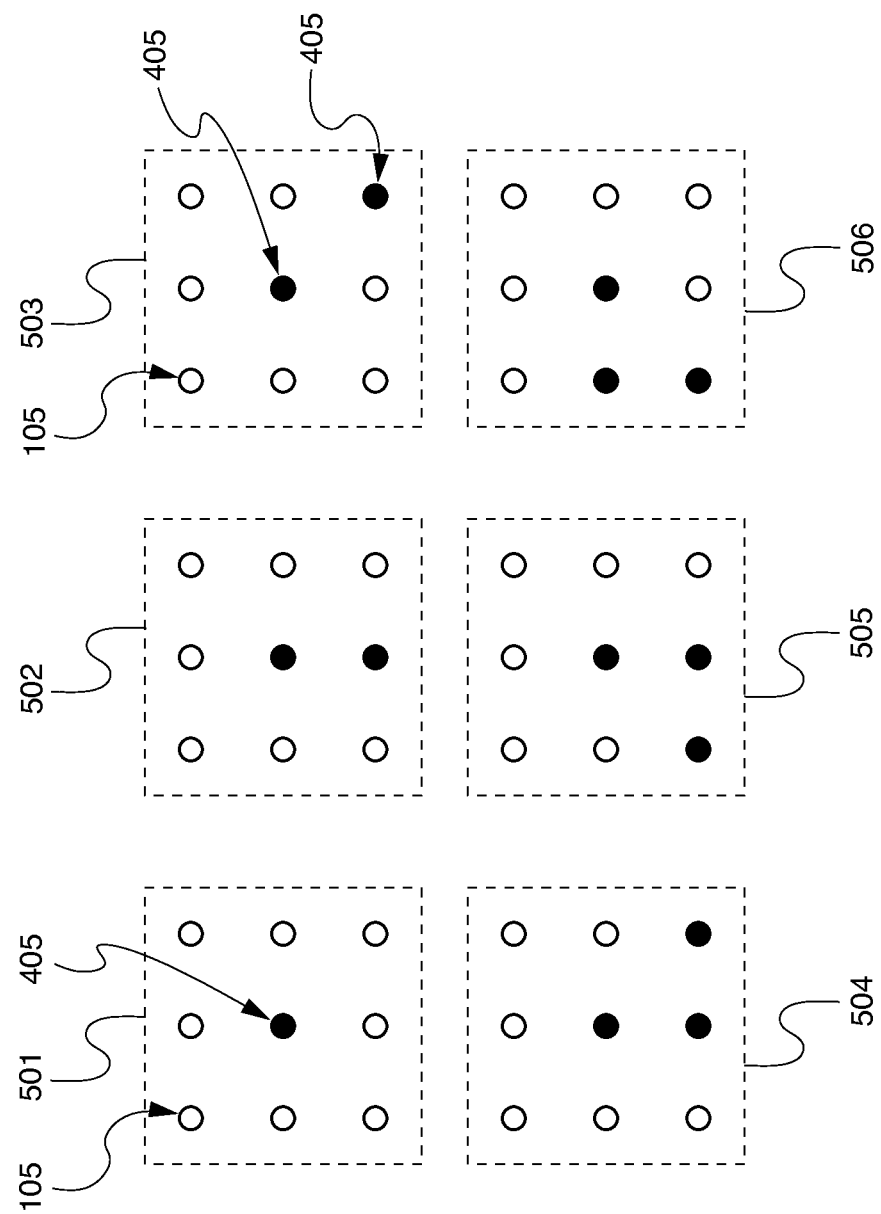
FIG. 5 illustrates several exemplary embodiments of occlusion patterns.

FIG. 5 illustrates several exemplary embodiments of occlusion patterns 501, 502, 503, 504, 505 and 506. Each exemplary pattern shown in FIG. 5 includes occluded sensor blobs 405 as well as un-occluded sensor blobs 105. As stated above, the inventive concept is not limited to only the shown exemplary occlusion patterns and many other occlusion pattern configurations may be used. In one or more embodiments, multiple occlusion patterns may be detected in the sensor grid simultaneously, which enables simultaneous detection of multiple locations of user-generated events, such as finger (or other suitable object) presence over the content 107. As would be appreciated by persons of ordinary skill in the art, this enables the multi-finger (suitable object) interaction capability of the described system as well as possibility for detecting multi-user interaction.

As would be appreciated by persons of ordinary skill in the art, there may be numerous other designs for occlusion patterns that may be recognized by the inventive system. In one or more embodiments, an occlusion pattern represents the occurrence of a user-generated event, such as presence of a finger (or stylus or other suitable object) at a particular location (usually the center) of the pattern. Potentially, any pattern that may distinguish the occlusion by a finger (or stylus or other suitable object) from the occlusion by other objects (which are not shaped like a finger, pointer or stylus) may be qualified to serve as an occlusion pattern. Such patterns should normally shape like thin and long strips to resemble a finger's shape. That is, in the pattern, the solid circles should normally form a thin, long strip surrounded by open circles. However, the parameters of the patterns (overall shape of the pattern, number of solid circles in a pattern, etc.) are heavily affected by the system's setup and the width of a user's finger (or other suitable object) and are largely determined by experimentation. In the experiments conducted by the inventors, it was found that using 3×3 block patterns described earlier yields the most robust result.

In one or more embodiments, exemplary viewport gesture interactions triggered by user-generated events may include panning, zooming and rotating of the viewport's content based on the detected finger movements. In various embodiments, the system may be configured to detect both one-finger or one-hand and two-finger or two-hand gestures. When detecting the two-finger (two-hand) gestures, the system detects dynamic positions of two fingers by detecting two separate occlusion patterns at two different locations on the viewport. In one or more embodiments, analysis of dynamic occlusion patterns over time triggers a sequence of finger movement events, allowing the viewport to implement the panning, zooming or rotating operation. In one implementation, a user gesture is recognized when, after a first occlusion pattern is detected, a second occlusion pattern is detected within a predetermined time interval (for example, 200 milliseconds), and the first occlusion and second occlusion are located within a predetermined spatial distance of one another. In other words, multiple detected occlusions satisfying predetermined temporal and positional constraints are recognized as user gestures.

In one or more embodiments, several robust techniques are provided to eliminate unintentional gestures and to minimize the visual interference of the sensor grid with the viewport's content during gesture interactions. In one or more embodiments, the techniques that eliminate unintentional gestures of the user may include a "press" event and a "release" event. In general, these two events are unlikely to be triggered by accident. In one embodiment, the press event occurs if a continuous presence of a finger at the same location is detected for a certain predetermined period of time (for example, 200 milliseconds). In one embodiment, the system is configured such that a press event must be detected before any of the panning, zooming and rotating operations are performed.

In one or more embodiments, a release event is determined to have occurred if the aforesaid press event has been previously detected for a specific user's finger, and, additionally, one of the following two conditions is met: 1) the continuous presence of this finger lasts for a certain predetermined time period (for example, 200 milliseconds) at the same location; or 2) the continuous non-presence of this finger lasts for a certain time period (for example, 200 milliseconds). In one embodiment, the detected release event marks the conclusion of any panning, zooming and rotating operations. As would be appreciated by persons of ordinary skill in the art, because in the described embodiment the panning, zooming or rotating operations must always begin with the press event and end with the release event, any unintentional gestures that could cause disorder of the viewport's content are eliminated.

In one or more embodiments, there is also provided a technique that minimizes the visual interference of the grid of sensor blobs 105 with the content 107 displayed in the viewport. Specifically, before the aforesaid press event occurs, all the sensor blobs in the sensor grid are visible, providing maximum coverage of the viewport. Upon a press event, only those sensor blobs that fall within a certain distance from the press event location are visible, with all remaining sensor blobs becoming invisible. That is, the sensor blob grid turns into a sensor blob disk centered around the finger location, see element 901 in FIGS. 9 and 10. This technique minimizes the visual interference of the sensor blobs with the viewport's content during gesture interactions. The disk of visible sensor blobs also serves as a visual guide and feedback for a user to move his or her finger. The radius of the disk determines how far and fast a user may move his or her finger. Upon a release event, all the sensor blobs in the sensor grid become visible again, providing maximum coverage of the viewport.

In one or more embodiments, upon detecting a press event, if a user's finger subsequently moves, the sensor disk moves along with the finger, keeping itself centered around the current finger location. In one embodiment, the size of the sensor disk is pre-determined by the system designer. As would be appreciated by persons of ordinary skill in the art, the size of the sensor disk affects how fast a user can move his finger and how much of the viewport's content is interfered with by the visual sensor blobs. In general, the bigger the sensor disk is, the faster the user can move his or her finger, making interaction more efficient. However, a bigger sensor disk will cover a larger portion of the viewport, interfering with a large portion of the viewport's content.

In one or more embodiments, to overcome this problem, the system is configured to generate sensor disks having sizes that can be changed dynamically. An exemplary algorithm for achieving this purpose can be briefly described as follows:

1. The system first analyzes the viewport's content around the finger location. Possible methods for content analysis include interest point detection and saliency analysis, which are well known to persons of ordinary skill in the art.

2. The system subsequently determines the importance of the viewport's content around the finger location.

3. Finally, the system determines the size of the sensor disk centered around the finger location based on the importance of the viewport's content around the finger location.

Figure 9:
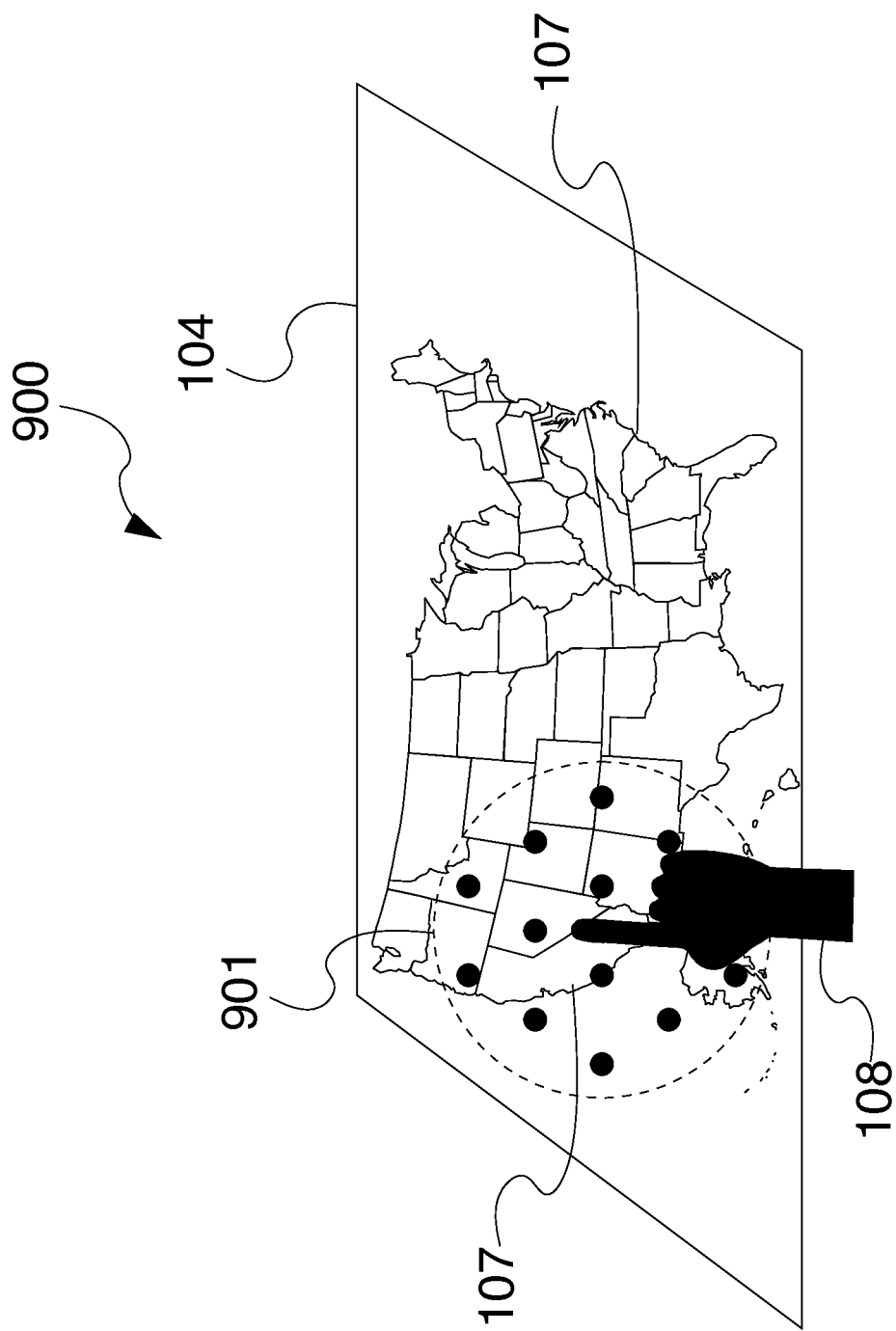
Figure 10:
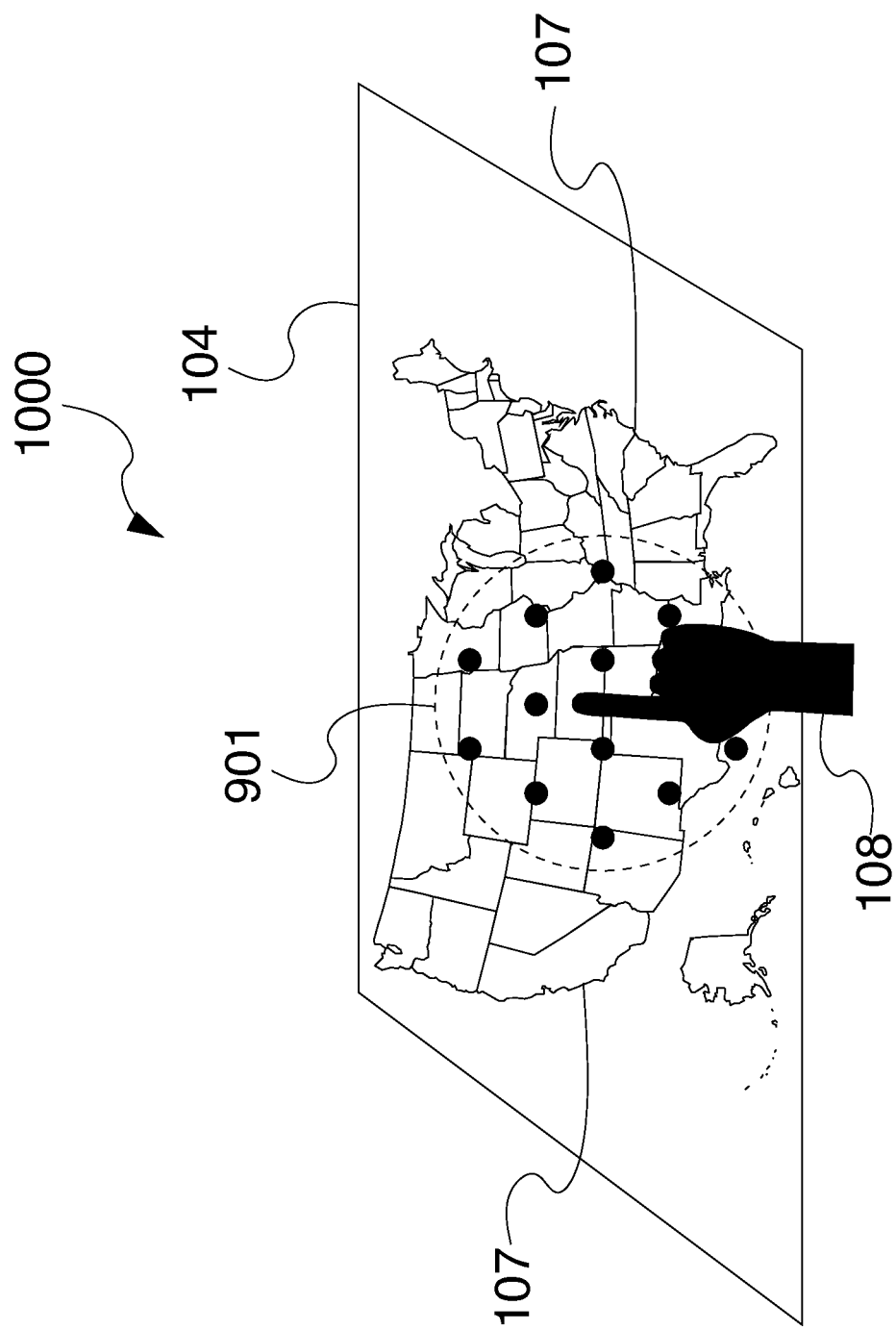

In one or more embodiments, the size of the sensor disk 901 in FIG. 9 is generally inverse proportional to the importance of the viewport's content around the current finger location. As at important areas of the content, we want the sensor disk to be smaller in order not to cover a large portion of the important areas. In addition, at important areas of the content, a user may want to see the details and does not usually want to move his or her finger fast. On the contrary, at unimportant areas of the content, we want the sensor disk to be larger, as at unimportant areas, a user is likely to move his or her finger faster for more efficient interaction. In addition, it is more acceptable for the larger size sensor disk to cover a larger portion of the unimportant area of the content than to cover a large portion of the important area of the content.

In one example, the importance of an area of content is determined based on the number of visual features within the aforesaid area that could be identified using image analysis techniques well known to persons of ordinary skill in the art. For instance, a blank area of content would not have identifiable visual image features and, based on this, would be considered as unimportant. On the other hand, more texture-rich content portion would be considered more important, as it would include more identifiable image features.

Figure 7:
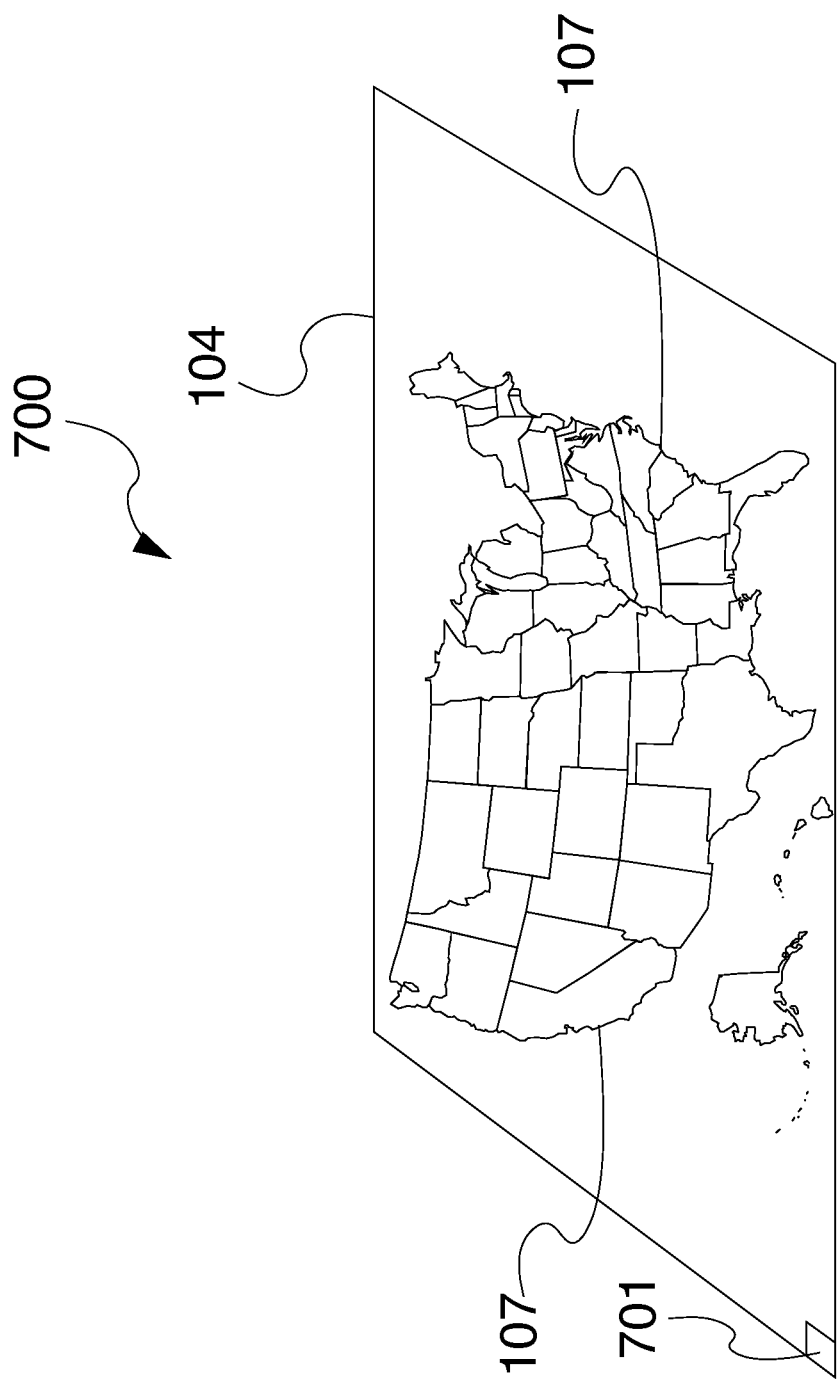
FIGS. 7, 8, 9 and 10 illustrate exemplary steps of the process for gesture interaction with the described gesture-based user interface in a real-life scenario.
Figure 8:
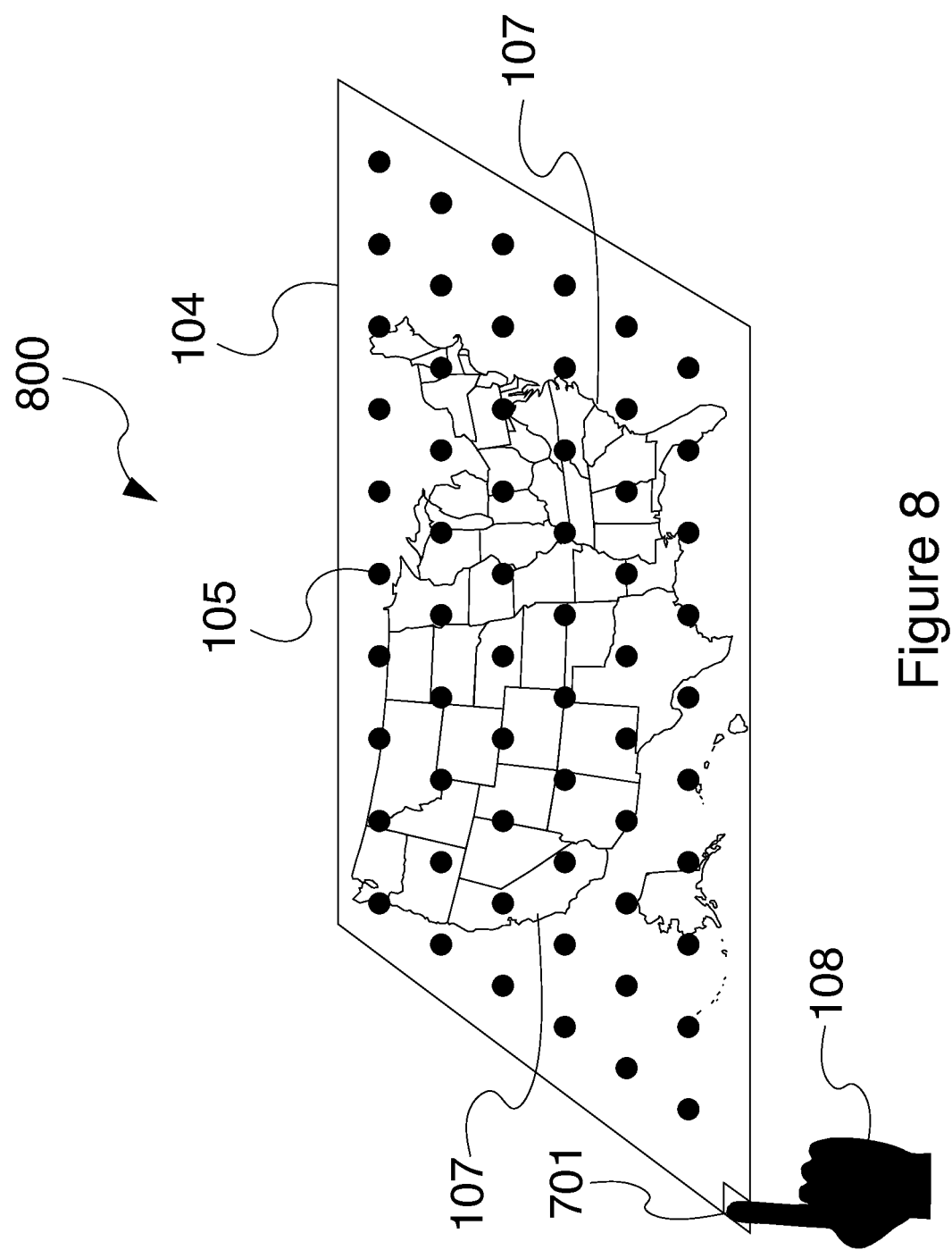

In one or more embodiments, to further minimize the visual interference by the sensor grid, the sensor grid is visible only when a user is performing gesture interactions. In one implementation, a user can turn on and off the sensor grid at any time. When the sensor grid is off, the gesture interaction capability of the viewport is disabled. In various embodiments, the described system may operate in accordance with of one of the below algorithms:

1. A user may turn on the sensor grid using a widget (e.g. a gesture button) external to the viewport, such as a gesture button 701 shown in FIG. 7. The sensor grid remains on until the user turns it off using a widget (e.g. a gesture button 701) external to the viewport. While the sensor grid is on, the user may perform gesture interactions in the viewport.

2. A user may turn on the sensor grid using a widget (e.g. a gesture button 701) external to the viewport. The user then proceeds to perform the gesture interaction. Once the gesture interaction is completed, the sensor grid is turned off automatically.

Figure 6:
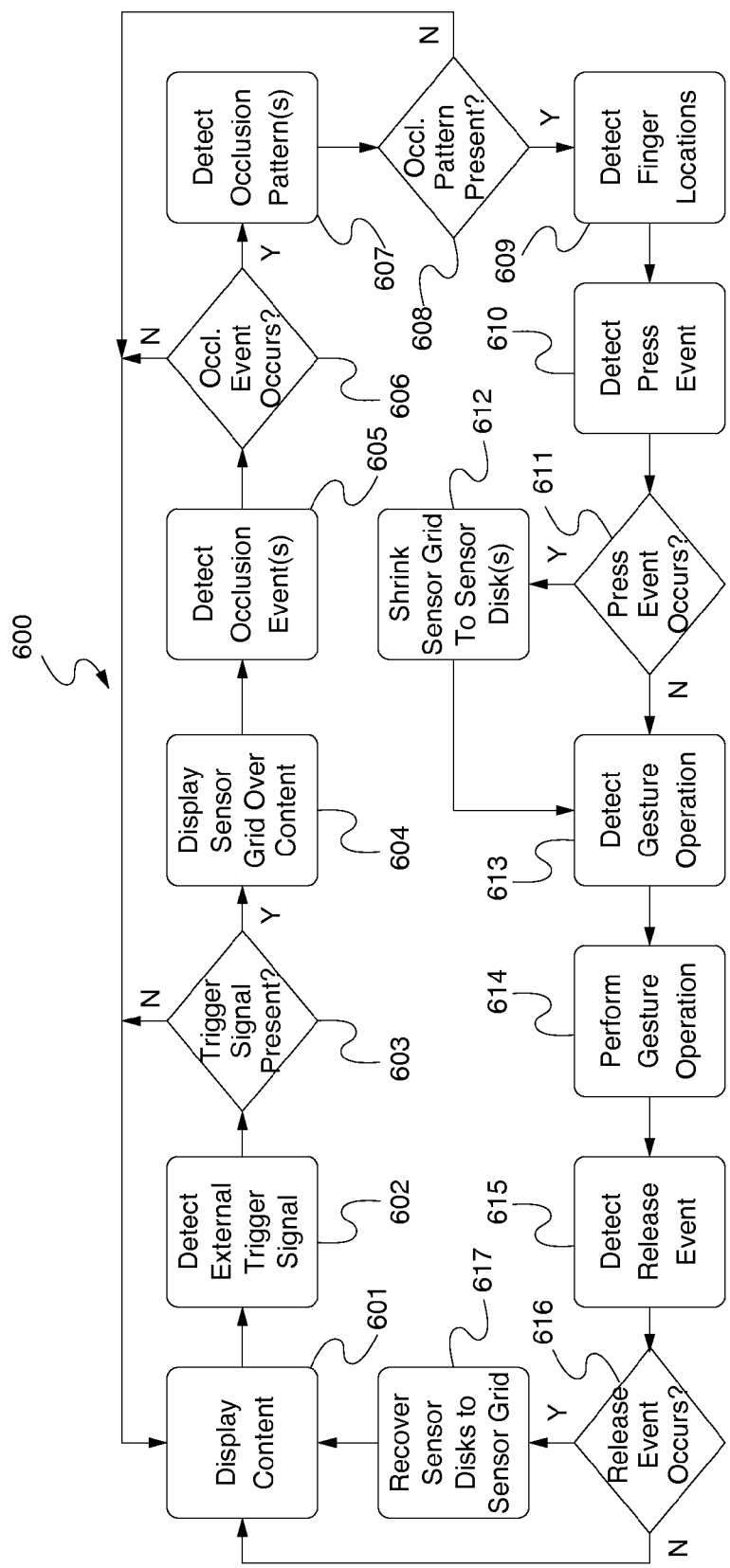
FIG. 6 illustrates an exemplary operating sequence of a process for user gesture detection based on occlusion of sensor blobs.

FIG. 6 illustrates an exemplary operating sequence 600 of a process for user gesture detection based on occlusion of sensor blobs. First, at step 601, the system displays the content 107 in the viewport using either the projector 101 and the display surface 104 or the electronic display device 201. At step 602, the system attempts to detect an external trigger signal. At step 603, the system verifies whether or not the aforesaid external trigger signal is present. For example, a trigger signal is present if a user presses a button external to the viewport. If, at step 603, the system fails to detect the presence of the trigger signal, the operation is returned to step 601, otherwise the operation proceeds to step 604.

At step 604, the system displays a grid of sensor blobs, overlaying it on top of the viewport's content 107. At step 605, the system uses the camera 102 to determine whether any occlusion events occur with the camera's field of view. The presence or absence of the occlusion events is verified at step 606. If it is determined at step 606 that no occlusion event occurred, the operation is returned to step 601. Otherwise, the operation proceeds to step 607. At this step 607, the system attempts to detect, based on the detected occlusion event(s), any pre-determined occlusion patterns. At step 608, the system determines whether the predetermined occlusion patterns have been detected. If no occlusion pattern presence is detected at step 608, the operation returns to step 601. Otherwise, the operation proceeds to the next step 609. In this step 609, the system detects the finger locations based on the detected occlusion patterns.

At step 610, the system attempts to detect any press events described in detail above. At step 611, the system checks whether the press event has actually occurred. If a press event has occurred, the sensor grid is shrunk into a sensor disk centered around the sensor blob location where the press event occurred, see step 612. Subsequently, the operation is transferred to step 613. Otherwise, the operation is transferred to step 613 directly.

At step 613, the system determines whether or not any gesture operation has been detected. For example, a panning operation is triggered if only a single finger is located and that finger has been detected to move. In another example, a zooming operation is triggered if two fingers are located and at least one of the fingers is detected to move. At step 614, the system performs the detected gesture operation, which may involve manipulating the viewport's content 107. Subsequently, at step 615, the system attempts to detect occurrence of any release event(s). If it is determined at step 616 that a release event has occurred, the sensor disk is recovered into a full sensor grid, see step 617, whereupon the operation of the system returns to step 601 and the operating sequence 600 is repeated.

FIGS. 7, 8, 9 and 10 illustrate exemplary steps of the process for gesture interaction with the described gesture-based user interface in a real-life scenario. With reference to the scenario 700 shown in FIG. 7, the content 107 is displayed on the display surface 104, the sensor grid is invisible, and no gesture interaction with the displayed content 107 is allowed. In one or more embodiments, a gesture button 701 external to the viewport may be provided to enable the user to generate the external trigger for initiating the described gesture interaction functionality. With reference to the scenario 800 shown in FIG. 8, the user turns on the grid of the sensor blobs 105 using a gesture button 701 external to the viewport, which may be activated by means of user's hand 108. With reference to the scenario 900 shown in FIG. 9, the user triggers a press event by pointing a finger of his hand 108 at a sensor blob location for a predetermined period of time, such as 200 ms, and, in response, the grid of sensor blobs 105 shrinks into a sensor blob disk 901. Finally, with reference to the scenario 1000 shown in FIG. 10, the user moves his finger to perform a pan operation on the shown map, while the center of the sensor blob disk 901 follows the location of the user's finger. It should be noted that the described interaction scenario as well as the described specific user gestures are exemplary only and many more interaction functions and supported user gestures may be implemented based on the concepts described herein.

Figure 11:
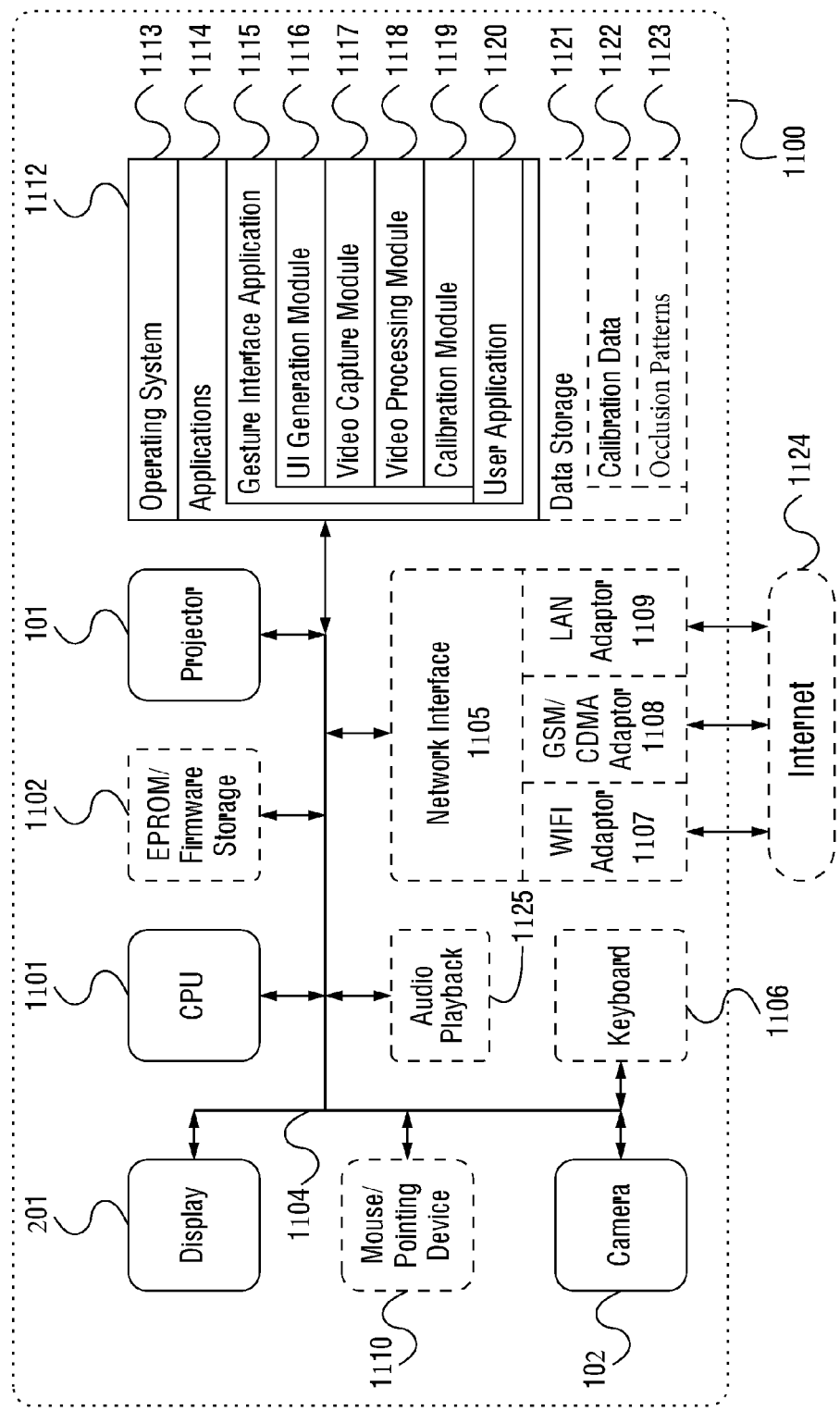
FIG. 11 illustrates an exemplary embodiment of a computerized system for detecting user gestures by analyzing dynamic patterns of occlusion of sensor blobs overlaying content.

FIG. 11 illustrates an exemplary embodiment of a computerized system 1100 for detecting user gestures by analyzing dynamic patterns of occlusion of sensor blobs overlaying content. In one or more embodiments, the computerized system 1100 may be implemented within the form factor of a desktop computer well known to persons of skill in the art. In an alternative embodiment, the computerized system 1100 may be implemented based on a laptop or a notebook computer.

The computerized system 1100 may include a data bus 1104 or other interconnect or communication mechanism for communicating information across and among various hardware components of the computerized system 1100, and a central processing unit (CPU or simply processor) 1101 electrically coupled with the data bus 1104 for processing information and performing other computational and control tasks. Computerized system 1100 also includes a memory 1112, such as a random access memory (RAM) or other dynamic storage device, coupled to the data bus 1104 for storing various information as well as instructions to be executed by the processor 1101. The memory 1112 may also include persistent storage devices, such as a magnetic disk, optical disk, solid-state flash memory device or other non-volatile solid-state storage devices.

In one or more embodiments, the memory 1112 may also be used for storing temporary variables or other intermediate information during execution of instructions by the processor 1101. Optionally, computerized system 1100 may further include a read only memory (ROM or EPROM) 1102 or other static storage device coupled to the data bus 1104 for storing static information and instructions for the processor 1101, such as firmware necessary for the operation of the computerized system 1100, basic input-output system (BIOS), as well as various configuration parameters of the computerized system 1100.

In one or more embodiments, the computerized system 1100 may incorporate a display device 201, which may be also electrically coupled to the data bus 1104, for displaying various information to a user of the computerized system 1100, such as user interfaces incorporating the grid of sensor blobs 105 described herein. In an alternative embodiment, the display device 201 may be associated with a graphics controller and/or graphics processor (not shown). The display device 201 may be implemented as a liquid crystal display (LCD), manufactured, for example, using a thin-film transistor (TFT) technology or an organic light emitting diode (OLED) technology, both of which are well known to persons of ordinary skill in the art. In various embodiments, the display device 201 may be incorporated into the same general enclosure with the remaining components of the computerized system 1100. In an alternative embodiment, the display device 201 may be positioned outside of such enclosure, such as on the surface of a table or a desk. In one or more embodiments, the computerized system 1100 may further incorporate the projector or mini-projector 101 configured to project information, such as user interface(s) incorporating the sensor blobs described herein, onto display surface 104, see FIG. 1.

In one or more embodiments, the computerized system 1100 may further incorporate an audio playback device 1125 electrically connected to the data bus 1104 and configured to play various audio files, such as MPEG-3 files, or audio tracks of various video files, such as MPEG-4 files, well known to persons of ordinary skill in the art. To this end, the computerized system 1100 may also incorporate waive or sound processor or a similar device (not shown).

In one or more embodiments, the computerized system 1100 may incorporate one or more input devices, such as a mouse/pointing device 1110, such as a mouse, a trackball, a touchpad, or cursor direction keys for communicating direction information and command selections to the processor 1101 and for controlling cursor movement on the display 201. This input device typically has two degrees of freedom in two axes, a first axis (e.g., x) and a second axis (e.g., y), that allows the device to specify positions in a plane.

The computerized system 1100 may further incorporate the camera 103 for acquiring still images and video of various objects, including the video of the sensor grid described herein, as well as a keyboard 1106, which all may be coupled to the data bus 1104 for communicating information, including, without limitation, images and video, as well as user commands (including gestures) to the processor 1101.

In one or more embodiments, the computerized system 1100 may additionally include a communication interface, such as a network interface 1105 coupled to the data bus 1104. The network interface 1105 may be configured to establish a connection between the computerized system 1100 and the Internet 1124 using at least one of a WIFI interface 1107, a cellular network (GSM or CDMA) adaptor 1108 and/or local area network (LAN) adaptor 1109. The network interface 1105 may be configured to enable a two-way data communication between the computerized system 1100 and the Internet 1124. The WIFI adaptor 1107 may operate in compliance with 802.11a, 802.11b, 802.11g and/or 802.11n protocols as well as Bluetooth protocol well known to persons of ordinary skill in the art. The LAN adaptor 1109 of the computerized system 1100 may be implemented, for example, using an integrated services digital network (ISDN) card or a modem to provide a data communication connection to a corresponding type of telephone line, which is interfaced with the Internet 1124 using Internet service provider's hardware (not shown). As another example, the LAN adaptor 1109 may be a local area network interface card (LAN NIC) to provide a data communication connection to a compatible LAN and the Internet 1124. In an exemplary implementation, the WIFI adaptor 1107, the cellular network (GSM or CDMA) adaptor 1108 and/or the LAN adaptor 1109 send and receive electrical or electromagnetic signals that carry digital data streams representing various types of information.

In one or more embodiments, the Internet 1124 typically provides data communication through one or more sub-networks to other network resources. Thus, the computerized system 1100 is capable of accessing a variety of network resources located anywhere on the Internet 1124, such as remote media servers, web servers, other content servers as well as other network data storage resources. In one or more embodiments, the computerized system 1100 is configured to send and receive messages, media and other data, including application program code, through a variety of network(s) including the Internet 1124 by means of the network interface 1105. In the Internet example, when the computerized system 1100 acts as a network client, it may request code or data for an application program executing on the computerized system 1100. Similarly, it may send various data or computer code to other network resources.

In one or more embodiments, the functionality described herein is implemented by computerized system 1100 in response to processor 1101 executing one or more sequences of one or more instructions contained in the memory 1112. Such instructions may be read into the memory 1112 from another computer-readable medium. Execution of the sequences of instructions contained in the memory 1112 causes the processor 1101 to perform the various process steps described herein. In alternative embodiments, hard-wired circuitry may be used in place of or in combination with software instructions to implement the embodiments of the invention. Thus, the described embodiments of the invention are not limited to any specific combination of hardware circuitry and/or software.

The term "computer-readable medium" as used herein refers to any medium that participates in providing instructions to the processor 1101 for execution. The computer-readable medium is just one example of a machine-readable medium, which may carry instructions for implementing any of the methods and/or techniques described herein. Such a medium may take many forms, including but not limited to, non-volatile media and volatile media.

Common forms of non-transitory computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read. Various forms of computer readable media may be involved in carrying one or more sequences of one or more instructions to the processor 1101 for execution. For example, the instructions may initially be carried on a magnetic disk from a remote computer. Alternatively, a remote computer can load the instructions into its dynamic memory and send the instructions over the Internet 1124. Specifically, the computer instructions may be downloaded into the memory 1112 of the computerized system 1100 from the foresaid remote computer via the Internet 1124 using a variety of network data communication protocols well known in the art.

In one or more embodiments, the memory 1112 of the computerized system 1100 may store any of the following software programs, applications or modules:

1 Operating system (OS) 1113 for implementing basic system services and managing various hardware components of the computerized system 1100. Exemplary embodiments of the operating system 1113 are well known to persons of skill in the art, and may include any now known or later developed mobile operating systems.

2. Applications 1114 may include, for example, a set of software applications executed by the processor 1101 of the computerized system 1100, which cause the computerized system 1100 to perform certain predetermined functions, such as display user interface(s) on the display device 201 or detect user's gestures using the camera 103. In one or more embodiments, the applications 1114 may include an inventive gesture interface application 1115, described in detail below as well as a user application 1120.

3. Data storage 1121 may include, for example, a calibration data storage 1122 for storing calibration data generated by the calibration module 1119 as well as occlusion pattern storage 1123 for storing the occlusion patterns of the sensor blobs in the sensor grid to be used in user gesture identification.

In one or more embodiments, the inventive gesture interface application 1115 incorporates a user interface generation module 1116 configured to generate an a user interface incorporating the sensor grid described herein using the display 201 or the projector 101 of the computerized system 1100. The inventive gesture interface application 1115 may further include video capture module for causing the camera 103 to capture the video of the occluded sensor blobs, the video processing module for processing the video acquired by the camera 103 and detecting user gestures based on dynamic patterns of occlusion of the sensor blobs, as well as the calibration module 1119 for detecting and storing the locations corresponding to the sensor blobs 105 of the sensor grid. Upon detecting user gestures, the inventive gesture interface application 1115 may send the appropriate control commands to the user application 1120.

Figure 12:
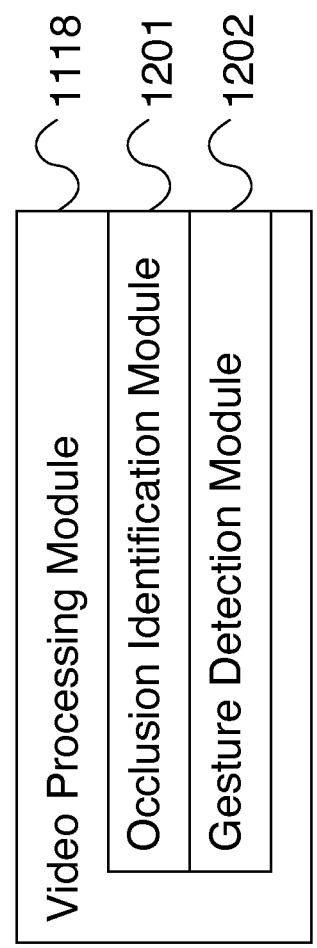
FIG. 12 illustrates an exemplary embodiment of a video processing module.

FIG. 12 illustrates an exemplary embodiment of the video processing module 1111. In one or more embodiments, as shown in FIG. 12, the video processing module 1118 incorporates an occlusion identification module 1201 for identifying occlusion of at least some of the sensor blobs 105 in the acquiring image of the user interface and a gesture detection module 1202 for detecting a gesture performed by the user based on the identified occlusion pattern(s) of the sensor blobs 105 in the sensor grid overlaying the displayed content 107. The aforesaid modules 1201 and 1202 operate in accordance with the method described above.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in the systems and methods for detecting user gestures using patterns of occlusion of multiple sensor blobs. It is intended that the specification and examples be considered as exemplary only, with a true scope and spirit of the invention being indicated by the following claims.

What is claimed is:

1. A computer-implemented method for detecting a gesture performed by a user in connection with a user interface comprising a plurality of sensor blobs, the method being performed in a computerized system comprising a central processing unit, a projector, a camera and a memory, the computer-implemented method comprising:
   a. using the projector to project a content and a plurality of identical non-contiguous dot-shaped sensor blobs on a display surface;
   b. acquiring a plurality of images of the plurality of identical non-contiguous dot-shaped sensor blobs projected on the display surface using the camera;
   c. using the central processing unit to identify occlusion of at least some of the plurality of non-contiguous dot-shaped sensor blobs projected on the display surface by the user in the acquired plurality of images of the plurality of non-contiguous dot-shaped sensor blobs; and
   d. using the central processing unit to detect the gesture performed by the user based on the identified occlusion of at least some of the plurality of non-contiguous dot-shaped sensor blobs in the acquired plurality of images.

2. The computer-implemented method of claim 1, wherein the projected plurality of sensor blobs overlay substantially the entire projected content.

3. The computer-implemented method of claim 1, wherein in b. the occlusion of at least some of the plurality of sensor blobs is identified based on color values at locations corresponding to the sensor blobs in the acquired plurality of images.

4. The computer-implemented method of claim 1, further comprising detecting a press event based on a condition that the identified occlusion of at least some of the plurality of sensor blobs matches a predetermined occlusion pattern and the identified occlusion persists for a predetermined time interval.

5. The computer-implemented method of claim 4, wherein the plurality of sensor blobs are projected onto the display surface and the detection of the gesture is performed in response to the detection of the press event.

6. The computer-implemented method of claim 4, further comprising, in response to the detection of the press event, projecting a second plurality of sensor blobs onto the display surface, wherein the second plurality of sensor blobs are initially arranged around the location of the detected press event.

7. The computer-implemented method of claim 6, wherein the second plurality of sensor blobs are arranged in a disk-shaped arrangement centered at a position of a last identified user-generated event.

8. The computer-implemented method of claim 4, further comprising detecting a release event based on a condition that the press event has been previously detected and:
   i. the identified occlusion of at least some of the plurality of sensor blobs does not occur for a second predetermined time interval; or
   ii. the identified occlusion of at least some of the plurality of sensor blobs occurs at a location of the press event for a third predetermined time interval.

9. The computer-implemented method of claim 8, further comprising suspending the detection of the gesture in response to the detection of the release event.

10. The computer-implemented method of claim 1, further comprising, responsive to the detection of the gesture performed by the user, issuing a command associated with the gesture.

11. The computer-implemented method of claim 10, wherein the command associated with the gesture is selected from a group consisting of: an image panning command; an image zooming command and an image rotation command.

12. The computer-implemented method of claim 10, further comprising detecting a direction of the gesture performed by the user, wherein the issued command is based, at least in part, on the detected direction of the gesture.

13. The computer-implemented method of claim 10, further comprising detecting a speed of the gesture performed by the user, wherein the issued command is based, at least in part, on the detected speed of the gesture.

14. The computer-implemented method of claim 1, wherein the gesture is performed by the user without physical contact with the display surface displaying the plurality of sensor blobs.

15. The computer-implemented method of claim 1, further comprising performing a calibration operation by identifying locations corresponding to each of the plurality of sensor blobs in the acquired plurality of images and storing information on the identified locations.

16. The computer-implemented method of claim 1, wherein the plurality of sensor blobs is arranged in a grid-like arrangement, wherein in c. detecting the gesture comprises detecting a user-generated event, the user-generated event being detected based on a condition that a first blob and at least one second blob adjacent to the first blob of the grid-like blob arrangement are occluded in accordance with a predetermined occlusion pattern and wherein the location of the user-generated event is the location of the first blob.

17. The computer-implemented method of claim 1, wherein the plurality of sensor blobs is arranged in a grid-like arrangement, wherein in c. detecting the gesture comprises detecting a user-generated event, the user-generated event being detected based on a condition that a first blob and at least one second blob adjacent to the first blob of the grid-like blob arrangement are occluded and at least one third blob of the grid-like blob arrangement is not occluded, the occlusion of the first and second blobs and non-occlusion of the third blob being in accordance with a predetermined occlusion pattern and wherein the location of the gesture is the location of the first blob.

18. The computer-implemented method of claim 1, wherein in c. the gesture is detected based on two occlusions identified at two different times within a predetermined time interval.

19. The computer-implemented method of claim 18, wherein the two identified occlusions occur within a predetermined distance of one another.

20. The computer-implemented method of claim 1, wherein the detected gesture is a continuous gesture.

21. The computer-implemented method of claim 1, further comprising providing a gesture widget, wherein the detection of the gesture is performed in response to the detection of an activation of the provided gesture widget by the user.

22. A non-transitory computer-readable medium embodying a set of computer-executable instructions, which, when executed in a computerized system comprising a central processing unit, a projector, a camera and a memory, cause the computerized system to perform a method for detecting a gesture performed by a user in connection with a plurality of sensor blobs, the method comprising:
  a. using the projector to project a content and a plurality of identical non-contiguous dot-shaped sensor blobs on a display surface;
  b. acquiring a plurality of images of the plurality of identical non-contiguous dot-shaped sensor blobs projected on the display surface using the camera;
  c. using the central processing unit to identify occlusion of at least some of the plurality of non-contiguous dot-shaped sensor blobs projected on the display surface by the user in the acquired plurality of images of the plurality of non-contiguous dot-shaped sensor blobs; and
  d. using the central processing unit to detect the gesture performed by the user based on the identified occlusion of at least some of the plurality of non-contiguous dot-shaped sensor blobs in the acquired plurality of images.

23. A computerized system comprising:
  a. a projector for projecting a content and a plurality of identical non-contiguous dot-shaped sensor blobs on a display surface,
  b. a camera for acquiring a plurality of images of the non-contiguous dot-shaped sensor blobs projected on the display surface;
  c. an occlusion identification module for identifying occlusion of at least some of the plurality of non-contiguous dot-shaped sensor blobs by the user in the acquired plurality of images of the sensor blobs projected on the display surface; and
  d. a gesture detection module for detecting a gesture performed by the user based on the identified occlusion of at least some of the plurality of non-contiguous dot-shaped sensor blobs in the acquired plurality of images.

* * * * *